United States Patent [19]
Mullins

[11] Patent Number: 5,857,197
[45] Date of Patent: Jan. 5, 1999

[54] SYSTEM AND METHOD FOR ACCESSING DATA STORES AS OBJECTS

[75] Inventor: Ward Mullins, San Francisco, Calif.

[73] Assignee: Thought Inc., San Francisco, Calif.

[21] Appl. No.: 822,254

[22] Filed: Mar. 20, 1997

[51] Int. Cl.⁶ .................................................... G06F 17/30
[52] U.S. Cl. .......................................... 707/103; 707/102
[58] Field of Search ..................................... 707/103, 102

[56] References Cited

U.S. PATENT DOCUMENTS

| | | | |
|---|---|---|---|
| 5,212,787 | 5/1993 | Baker et al. | 395/600 |
| 5,257,366 | 10/1993 | Adair et al. | 395/600 |
| 5,418,950 | 5/1995 | Li et al. | 395/600 |
| 5,542,078 | 7/1996 | Martel et al. | 395/600 |
| 5,717,877 | 2/1998 | Orton et al. | 395/326 |
| 5,720,007 | 2/1998 | Hekmatpour | 706/50 |
| 5,727,950 | 3/1998 | Cook et al. | 434/350 |
| 5,761,499 | 6/1998 | Sondregger | 707/10 |
| 5,761,509 | 6/1998 | Danforth et al. | 395/701 |
| 5,767,854 | 6/1998 | Anwar | 345/355 |
| 5,778,368 | 7/1998 | Hogan et al. | 707/10 |
| 5,784,553 | 7/1998 | Kolawa et al. | 395/183.14 |

*Primary Examiner*—Wayne Amsbury
*Attorney, Agent, or Firm*—Seidel, Gonda, Lavorgna & Monaco, PC

[57] ABSTRACT

A system and a method for accessing a data store as objects from an object application. The accessed data store could be either an object data store or a non-object (e.g. relational) data store. The system includes an object schema including meta data corresponding to a data store schema and an adapter abstraction layer. The adapter abstraction layer comprises a first adapter, and a second adapter. One embodiment of the system includes an object schema manager to create and maintain the object schema at run time. It comprises a dynamic, scalable, centrally managed, and secure method for accessing data stored in both object and non-object (e.g. relational) data stores, effecting a consistent interface to the data store regardless of its underlying structure, or a method of transport and level of security.

8 Claims, 1 Drawing Sheet

FIG. 1

SYSTEM AND METHOD FOR ACCESSING DATA STORES AS OBJECTS

FIELD OF THE INVENTION

This invention relates to a system and method for accessing a data store—which could be either an object or a non-object data store—as an object from an object application. The system includes an object schema including meta data corresponding to a data store schema and an abstraction layer. In one embodiment, the abstraction layer includes a first adapter and a second adapter. One embodiment of the invention includes an object schema manager to create and maintain the object schema as meta data, and an access adapter to access and manipulate the data store using the meta-data at run time.

BACKGROUND OF THE INVENTION

Systems for accessing data stores from object oriented languages have been used for many years. A frequent approach to accomplish access of data stores involves writing and embedding custom access code within an object application needing the access. This approach is generally limited to having the custom code access only a single relational table within a relational database or similar construct within any other data store (hereinafter collectively "data store"). Under the circumstances where a developer has control over the design and creation of a data store from its inception, it is possible to design and store meaningful information in a single table. Such design opportunities are usually rare, however.

Generally, the design goals of a properly normalized relational data store for example conflict with those of object application models. In most situations, the respective structures simply do not conveniently allow for mapping of the application object into a single relational table. This results in application objects which logically span multiple relational tables, and which require multiple translation modules in order to do useful work. Such an approach is both costly and unwieldy in terms of computing and development resources.

In those circumstances where the object can conveniently map to a single relational table, the general design philosophy prevailing in the programming industry is to embed access code in the application code itself. Because the current techniques involve the creation of custom code for each table being accessed, it is costly and time consuming to create and maintain such access applications. It means that either custom objects for access must be created for each object (such as shown in U.S. Pat. No. 5,212,787), or that the access code be embedded in the object itself, which is a common technique used in the industry. In either case, separate database specific code must be embedded in an application object. Such code specific embedding affects data store portability and code maintenance as well as significantly impacts distribution/bug-fix issues.

The recent growth in popularity and acceptance of object oriented programming languages has required a more object-oriented view of data stores. There are many different types and kinds of data stores. The need to consistently view the data stores with objects is universal. Current systems are inflexible, inconsistent and inadequate to meet this need.

The common modeling technique of the current systems is to map the underlying non-object data types directly as objects, as opposed to a more logical view of the data which may span many physical data stores or data store objects. Viewing non-object entities directly as objects makes migration from object stores to non-object stores and back again difficult and inefficient.

Further difficulties are created by mapping tools that attempt to map objects to non-object data stores. The common technique in such mapping is to 'generate' an object view which is then embedded in the object application code. Unfortunately any minor modification to the underlying non-object data store can break application code, thus creating a 'brittle client'. As used in this application, brittle client refers to a situation where a client application breaks under minor changes to the data store's physical layout (i.e. data store schema), which require no 'logical' changes in the object application logic, but which requires embedded access code to change in order to successfully use the object application. Another common approach of the prior art is to use another intermediate, or an 'object store', also commonly referred to as a gateway (see e.g. U.S. Pat. No. 5,542.078), where mapping occurs. While this is a workable solution for some, many companies do not need nor want the extra management and complexity of yet another data store system. The facilities provided for data management, integrity, and record locking are often duplicated in both systems unnecessarily, providing overly redundant and complex systems. Most gateways also suffer in various degrees from lack of portability, security, and scaling, as they have to route their requests through their data store to get to other data stores.

Regardless of the logical solutions previously applied, the current systems do not properly address all of the aspects of creation, maintenance, security, and management properly. Because extensive time is required to master both an advanced data store system (such as a relational data store) and an advanced object oriented programming language, the costs associated with projects involving both systems are often viewed as expensive investments for the entities needing the development. Generally, object oriented application developers are not very intimate with advanced data store (i.e., relational) theory and performance tuning. Having a centrally managed and controlled relational access system is essential for organizations concerned with the efficiency and mechanisms for accessing data stores. There is no prior art system providing a much needed mechanism to completely separate the skills necessary to program with objects, from those necessary to create and maintain data store schemas and access code.

Accordingly, there is a need to dynamically build the code for accessing the data store at runtime, based on the object and its attributes, as opposed to embedding the access code within the object. There is also a need to reduce the maintenance costs of keeping both object and data access code up to date and in sync with one another in all of the application code, as well as allowing application data objects to readily work with any underlying data store regardless of any differences in their access methods and access code. There is also a need for such an approach in light of the explosive growth in the volume of new applications currently being developed for environments such as the Internet, which applications need to be dynamic and easy to manage. There is a need for a generic object oriented mechanism to bridge various underlying data stores consistently, especially in a transparent, generic, centrally manageable, and secure way. The present invention fills those needs.

SUMMARY OF THE INVENTION

The present invention comprises a system and method for accessing a data store having a data store content and a data store schema as object(s) from an object application. The system comprises an object schema and an adapter abstraction layer. One embodiment of the adapter abstraction layer comprises a first adapter and a second adapter. The object schema includes meta data corresponding to the data store schema in some meaningful object-oriented view of data store content maintained at the data store.

One embodiment of the subject invention comprises the first adapter in communication with the object application and includes an application bridge receiving an object comprising object attributes and an object name. The first adapter also extracts the object attributes and the object name from the object to effect packing of the object attributes and the object name as data. Upon receiving new attributes from the data store, the first adapter also unpacks the data to effect instantiating the object attributes and the object name into a new object.

The second adapter is in communication with at least one of the first adapter(s) and in communication with at least one data store. The second adapter includes (or dynamically loads) a meta data map comprising object name(s) and provides the data store content from at least one data store corresponding to and based on the object attributes and the meta data.

One embodiment of the system uses an object schema manager to create and manage the object schema to be used at run time.

The present invention discloses an improved data access system and, in particular, a dynamic, scalable, centrally managed, and secure method for accessing data stored in both object and non-object (e.g. relational) data stores. The present invention effects a simple and consistent interface to at least one data store(s) regardless of its underlying structure, or method of transport and level of security implemented to access the data store.

BRIEF DESCRIPTION OF THE DRAWING

For the purpose of illustrating the invention, there is shown in the drawing a form which is presently preferred; it being understood, however, that this invention is not limited to the precise arrangements and instrumentalities shown.

DESCRIPTION OF THE PREFERRED EMBODIMENT

While the invention is described herein in connection with a preferred embodiment, it is understood that it is not intended to limit the invention to that embodiment. To the contrary, it is intended to cover all alternatives, modifications, and equivalents as may be included within the spirit and scope of the invention as defined by the appended claims.

An illustrative embodiment of a system and a method for accessing a data store as an object from an object application may be implemented using a product such as CocoBase Family of products, products of Thought, Inc., an assignee of the present invention, and the Java DataBase Connectivity Layer (JDBC), using a 3-tier architecture over a distributed network such as an Internet, Extranet, or Intranet.

Figure 1:
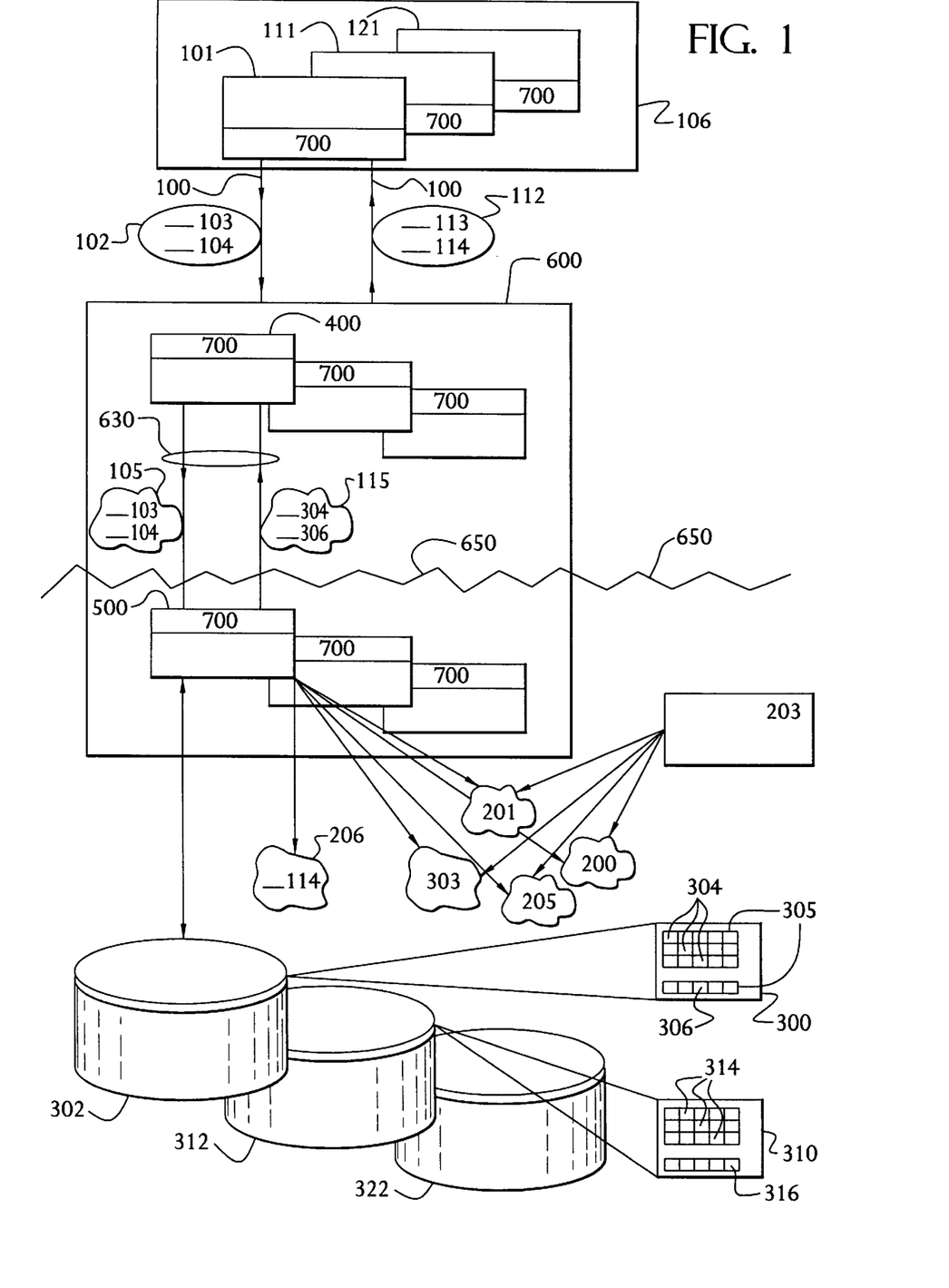
FIG. 1 illustrates an object application request as it is processed by the present invention, such processing in conjunction with a schema manager, and the way in which the present invention further processes the request.

FIG. 1 illustrates one such embodiment involving a request 100 by an object application 101 and the processing of such request. The system according to one embodiment of the present invention comprises an object schema 200 including meta data 201 corresponding to a data store schema 300, a first adapter 400, and a second adapter 500. In the preferred embodiment of the subject invention the object application 101 is a java applet "cocodemo.java" listed in appendix A.

One embodiment of the present invention uses a user defined object view of an underlying non-object store, i.e. the object schema 200. The object schema 200 is accessed by an object application 101 through an abstract layer 600 which does the necessary conversions between object and non-object views. This abstraction allows both kinds of data stores—object and non-object (e.g. relational)—to be accessed identically from at least one object application 101.

Moreover, by applying simple object streaming, the subject invention is capable of accessing objects distributed over a three tier environment using exactly the same application program interface ("API") 700 as the local two-tier environment. This is accomplished by using access "adaptive" technology comprising the adapter abstraction layer 600.

The adapter abstraction layer 600 of the subject invention performs any translation work necessary for converting objects to both object data stores 312 and non-object data stores 302. The adapter abstraction layer 600 provides a consistent API 700 for both object and non-object data stores and enables application programmers to migrate between various object stores without application modification. The adapter abstraction layer 600 also facilitates communication with a remotely available second adapter 500 without modifying the object application 101 programming logic.

In one embodiment, the subject invention includes the use of meta data 201 (i.e. data used to describe other data) to define how to access and convert non-object data store content 304 to objects and back. This is accomplished by paring down the non-object data store schema 300 into its various components including tables, fields, and conditions 305 in one embodiment. The paring makes the creation, management, and access to the meta data 201 to be a convenient and elegant task. By using the adapter abstraction layer 600 which understands and uses the meta data 201, the subject invention provides an abstract view of an underlying data store(s) 302 (312, 322) as an object store. The effected abstraction produces an architecture whereby the underlying data store(s) 302 (312) as well as multi-tier adapters (e.g. 400, 500, 4XX, and 5XX) may be interchanged without object application 101 code modification.

One embodiment of the subject invention is implemented using the adapter technology and is therefore capable of being deployed as either a 2-tier or as a 3-tier environment transparently. The adapter abstraction layer 600, and more specifically the first adapter 400, communicates with a server process, more specifically the second adapter 500, in communication with the underlying data store 302, which transfers the requested data store content 304 to and from the first adapter 400 in communication with object application 101 client. The first adapter 400 instantiates the object 112 from more primitive datatypes comprising data 115, reflecting the data store content 304 obtained from the server process, more specifically the second adapter 500. The method of breaking down objects 102 (112) into the corresponding primitive types comprising data 105 (115) ensures successful transfers of any kind of object irrespective of object application 101 views of the object(s)' data elements. The subject invention uses the adapter technology to dynamically load data store access code 205 at runtime. This architecture requires objects to serialize themselves in order to be persistable or for the computer language and language runtime to be able to inspect and set an object's structure in such a way as to be able to automatically persist the object's contents. Persistable is a term of art which means an object's contents can be saved to some more permanent location such as a computer disk, and in this case refers to the storage and retrieval of the object's contents from a data store. As a result, the present invention can readily adapt to an N-tier adapter solution which accesses the data store through some intermediate data server, thereby increasing deployment and scalability options.

FIG. 1 shows one embodiment of the present invention which works in conjunction with an object schema manager 203. The object schema manager 203 allows data store administrators to create and maintain an object view of data store content 301 stored in the data store 302. The object schema manager 203 reads, writes, and updates the meta data 201. One embodiment of the present invention directed to accessing non-object (e.g. relational) data stores 302, creates meta data 201 based on data store schema 300 comprising tables, fields and clauses or conditions 305, making up the data store 302. One such embodiment comprises a set of tools which create and maintain the meta data 201 by storing the information in a repository (such as the data store 302 itself), which information is then loaded by the second adapter at runtime. This meta data 201 then serves as a map for operations available on the data store(s) 302 (312), for the way these operations should be performed and under what conditions.

FIG. 1 further illustrates how the object schema manager 203 facilitates the creation and maintenance of the object schema 200, thereby increasing productivity and reducing the opportunities for typographical errors, which can create preventable runtime errors. The object schema manager 203 permits dynamic modification of object schema 200 without requiring modification or recompile of the object application 101 to ensure the object application clients are not 'brittle' as is traditionally the case in data store access applications. One embodiment of the subject invention uses the meta data 201 to construct an object view of the data store schema 300, e.g. an object schema 200, and uses the meta data 201 to generate one or more commands 303 for accessing the data store content 304. The deployment of meta data 201 in this way in one embodiment has the effect of using the non-object data store(s) 302 to be described and accessed as object(s) 102, thought its contents may be more rudimentary and abstract.

One embodiment of the subject invention stores meta data 201 in a data store 204 and dynamically loads and executes meta data 201 at runtime. As a result, in one embodiment of the invention access code 205 corresponding to the command(s) 303 is centrally created and managed in a central repository, i.e. data store 204. Such central repository architecture allows object schema(s) 200 to be re-used across objects 102 (112) and object applications 101 (111, 121). Such approach also allows for any changes of one object schema 200 to be transparently reflected to any client object application 101 accessing and using the object schema 200, without the need for object application 101 modification or recompilation. The subject invention contemplates a notification mechanism so that data store 302 modifications resulting from requests in one location be immediately communicated to all object applications 101 accessing that object schema 200.

One embodiment of the subject invention facilitates the separation of data store access code 205 (such as Structured Query Language "SQL") from the object application 101 logic. This facilitates simple and rapid application development and lowers maintenance cost by improving the flexibility of the object application 101 and by reducing the brittleness of the object application 101 client(s). As a result, users of the subject invention attain a cost savings by centralizing the task, reducing the possibility of typographical errors, installation problems, and skills availability shortages. The object stores can be created and managed by someone with data store (i.e. relational) expertise (as most modern organizations have) without requiring those individuals to also have object programming expertise.

One embodiment of the subject invention results in an architecture for centrally storing and managing object schema 200 to promote re-use, effect enhanced performance, and better use of (MIS) engineering and administrative personnel skills. By way of example, storing the access code 205 within the physical confines of the non-object data store 302 in one embodiment, creates a centrally manageable and maintainable system for accessing that non-object store 302. The object schema manager 203 thus allows for better use of the MIS personnel's skill sets by focusing on data access in terms familiar to people maintaining their respective system. That is, one embodiment of the subject invention allows object application engineers to concentrate on applications code without concern for or need to learn SQL or any other native access code 205 of the data store 302. At the same time, data store administrators may concentrate on managing and maintaining the data store(s) 302 without knowledge of application programming and without concern that any changes in the data store content 301 or data store schema 300 will adversely affect the object application(s) 101 in communication with the data store(s) 302 according to one embodiment of the subject invention.

A central management architecture provided by one embodiment of the present invention allows data store specialists to see, manage and control all access to the data store(s) 302 down to the individual access code 205 commands. It also allows for the fine tuning and reconfiguration of those commands by the data store specialists, without involvement of object application developers. The architecture allows the best skills to complete the respective task at hand without impacting or being impacted by the lack of available skills that an individual may not have in the other area.

In one embodiment of the subject invention the object schema manager 203 allows for the arbitrary creation and management of object schema(s) 200 via a point and click interface, thereby significantly increasing the efficiency of creating the data store access code 205, and improving the reliability of the overall system. This embodiment also allows completely arbitrary joining and combining of the data store content 301 as a single object view of that data, and overcomes the constrained and often uselessly arbitrary or non-existent foreign key constraints of conventional mapping systems and data stores. These hardcoded links such as foreign key constraints may not be supported properly by all underlying data stores, and not be implemented by the specific customer's data store (often legacy) implementation. New foreign key constraints are often not possible on some data stores because they may not work properly with older applications if the constraints were to be created and enforced.

As a point of reference, a foreign key is generally accepted as a predefined relationship or link which the data store manages in order to ensure that records are properly related in a database. A simple example would be to have a foreign key between an order number in an order table, and an order number in a line item table which keeps the individual items belonging to that order. The foreign key in this example would be between the order numbers in both tables, which might not allow, for example, a line item record to be entered if there is no order in the order table corresponding to the order number.

A join using this embodiment may occur on any arbitrary field of any table within the data store schema 300, even if a foreign key does not exist between the fields of the two tables to be joined. Such flexibility is immeasurably useful when combined with the ability of the object schema manager 203 to access more than one data store 302 at the same time. The resulting architecture of the subject embodiment allows data store content 301 from one data store 302 to be joined with data store content 311 from another data store 312 through the object schema manager 203 without requiring any data store schema 300 changes to either system whose content is being joined. Such transparent and independent flexibility is of utmost value for the many diverse data stores currently operated by most large and small business and other entities.

One embodiment of the subject invention provides a way to manage the data store access code 205, requiring only an understanding of the data store 302 and the data store schema 300, instead of requiring object programming knowledge within the modem working environment.

Once the object schema 200 is created, the object application 101 running in the application environment 103 sends a request 100 for an object 102 (possibly including an object data with lookup attributes to be matched) located in at least one data store such as an object data store 312 or a relational data store 302 in one embodiment of the subject invention. At a very high level, the request 100 is dynamically translated to a data store specific request which is then executed and results of which are parsed and new data object(s) 112 created and initialized with the results of the executed request 100.

In one embodiment of the present invention, the request 100 and the accompanying object 102 is passed from the object application 101 to the adapter abstraction layer 600 comprising the first adapter 400. The first adapter 400 then extracts the object attributes 103 and the object name 104 from the object 102, and packs the object attributes 103 and the object name 104 as data 105 to be used in communication and transport layers. The first adapter 400 then communicates the data 105 and the request 100 to the second adapter 500. The communication medium 630 between the first adapter 400 and the second adapter 500 may comprise an Internet connection, whereby the second adapter 500 is operating inside a firewall. Logical division 650 comprises a logical separation between a client, e.g. the object application 101, and a server, e.g. the abstraction layer 600 and more specifically the second adapter 500.

The second adapter 500 searches a meta data map 206 comprising at least one object name 114 using the object name 104 to determine whether the object name 104 exists in the meta data map 206. If the meta data map 206 contains the object name 104, then the second adapter 500 uses the object attributes 103 and the found meta data map 201 to generate at least one command 303 for accessing the data store 302 according to the request 100, if the command has been enabled, ensuring further security by restricting access. By way of example, the subject invention contemplates the use of this technology to provide read only data stores over the Internet, irrespective of the user's standard privileges within the context of the data store.

The second adapter 500 then executes at least one such command 303 as a data store access client server process 500 in communication with the data store 302, and obtains the data store content 301 and an execution status 306 based on executing at least one such command 303.

The second adapter 500 then processes the data store content 304 and the execution status 306 using meta data 201, and packs the obtained data store content 304 and the execution status 306 as data 115. The second adapter 500 communicates the data 115 to the first adapter 400.

The first adapter 400 unpacks the data 115 and instantiates the object attributes 113 and the object name 114 into potentially one or more new object(s) 112 and/or status according to the request 100 and the data 115. The first adapter then communicates the request 100 and at least one such new object 112 and/or status, if object results were found, from the first adapter 300 to the application program 101.

Several points should be noted regarding the implementation of the subject invention in the preferred embodiment. As each object(s) 102 data is being read from the data store(s) 302 (312), an instance of the object's class type (or potentially some generic container object) is instantiated (in the preferred embodiment a Java Class is instantiated for each set row result returned) and initialized to the row of attributes returned in the result set. Because Java can instantiate new objects based on classname, objects can be managed by the preferred embodiment of the subject invention even though it may have been unaware of their existence or composition at compile time. For ease of implementation, each java class in order to be supported by the preferred embodiment must implement a standard interface. With compliance to this standard interface, the subject invention can call the methods necessary to initialize the data automatically, making new instances automatic and transparent to the client object application 101.

Implementation of explicit reference handling is not required using the subject invention, and therefore is not implemented in the preferred embodiment. Unlike more rigid systems which limit the type of operation and mechanisms which will and can be used to access data stores, the subject invention allows for flexibility. This is to reflect the market reality that most organizations operate large systems in place which should be capable of being accessed from a variety of sources in a variety of different ways. Any attempts to manage references in these mixed environments would not only prove a futile exercise, but would complicate and reduce reliability, without providing the desired functionality. As for reference handling within the object application, the Java language which was used to implement the preferred embodiment, has language supported reference counting within its memory management and garbage collection software. It is contemplated by the subject invention, however, that specific adapters and data objects may be implemented with this architecture for specific data stores supporting appropriate reference handling management.

The preferred embodiment of the subject invention uses an in-memory list to maintain object references, which list is either partially or fully prefetched. The object application may retrieve one object, all of the objects at once, or in blocks of default, or user defined size. Once the objects are in the memory list, they can be iterated through using their offset in the list as their index. The subject invention contemplates incorporating smart vectors which will automatically fetch Objects as they are requested from the vector itself, instead of the object application manually having to go back to the data store to request new blocks.

The preferred embodiment provides non-granular simple transaction support, although the subject invention contemplates either building it's own transaction management system, or using a pass through mechanism which allows for more sophisticated transaction management to be written by the application programmer, if the underlying system supports it. Any limitations due to the preferred embodiment being implemented in the Java Driver Database Layer and JDBC or the Java DataBase Connectivity Layer are not contemplated by the subject invention. Thus, the subject invention contemplates using more advanced transaction management, as available in the implementing language and architecture.

When the subject invention is used to access the non-object data store 302, e.g. relational databases, the object schema 200 providing meta data 201 descriptions of how to map to the underlying data store 302 is used to generate the native access code 205 necessary to access the data store content 304. One embodiment of the subject invention uses the object schema 200 to build an SQL statement at runtime, which is then executed to get the desired results, based on the request 100. Because multiple statements are likely to be executed against a given class type once it has been accessed once, the present invention caches the meta data for the class (name) in memory, within the second adapter 500 and saves pre-compiled versions of the access code 205 which can simply be re-executed without recompile. This approach provides improved performance characteristics for successive accesses. In the three-tier design embodiment of the subject invention, the cache is physically located on the server, and is therefore shared across all client accesses to that server, providing a performance optimization in an area where performance is most critical.

The present invention comprises the adapter abstraction layer 600 comprising a set of runtime adapters (e.g. the first adapter 400, the second adapter 500, the n-th adapter 4XX, 5XX), which can be transparently interchanged by the object application 101. The adapters serve various functions such as direct 2-tier data access, or 3-tier or even n-tier gateway/transport. Because all adapters implement the same API 700, they are interchangeable in the object application 101, providing new and useful functionality, even beyond the subject implementation, without requiring object application 101 modification. Object application 101 runtime flags can instantiate entirely new adapters which might interface with radically different data store(s) 302 without modification to object application 101.

When data store access code, e.g. SQL, is dynamic verses pre-compiled, there is typically some performance penalties to be paid for dynamic execution. In the preferred embodiment, the subject invention addresses these performance issues by pre-compiling SQL the first time a given SQL operation is executed, and by preserving the compiled statement within the second adapter 500 for future executions from the same or a different first adapter 400. The subject invention binds variables to the statement, and re-issues the generated access code with the new SQL. As a result, the penalty as to dynamic execution becomes a slight overhead the first time an object 102 of a given type is requested from the abstraction layer 600. Past this first point the performance characteristics should be the same as from any other embedded SQL client, perhaps even better because the amount of information to be processed and transferred to the server accessing the data store 302 is likely to be less using the architecture of the subject invention than one which embeds SQL within a client object application and ships it with every request, and then must process the results inline, and often unnecessary descriptive data that is returned, and which is unnecessary in a system which is already preprogrammed with and understanding of the composition of the return values.

Because the first adapter 300 packs object request(s) 100 as a single API 700 call returning a single complex result (building the resulting data objects 112 transparently in the client from the returned complex data 115 packet), the subject invention reduces network latency (which is essential to reduce over the Internet and other io-bound and high latency networks) and increases the performance and scalability of the involved clients and servers. The subject invention also reduces the quantity of extraneous information which is always returned to client object applications by prior art systems such as the JDBC type-3 distributed database access layer architecture upon which other common Java Database Products are currently built. As a result, not only does the present invention obtain tremendous performance gains by reducing the latency of multiple network roundtrips, it also reduces the quantity of data and therefore increase the number of clients it can support, since each request/response requires less I/O. Compression and data duplication reduction techniques are contemplated by the subject invention to further increase, performance.

New adapters, e.g. 4XX, 5XX, may be added to the adapter abstraction layer 600 dynamically, even at runtime, as long as they comply with the API 700. This allows data store(s) 302 (312) to have custom adapters built for them (such as object data stores or other relational and/or non-relational data sources) which comply with the API 700 of the subject invention and are loadable in the same way as the adapter abstraction layer 600 taught by the subject invention.

With the burgeoning of the Internet, secure access to data is essential. The subject invention implements security by using a novel approach in comparison to the current software trends and prior art systems. That is, instead of creating 'embedded' access code which goes into a client or a server at creation time, and which must be conveyed to the server, which therefore must be opened up to these general request, the subject invention teaches extracting, managing, and executing the access code exclusively and dynamically on the server for the described 3-tier system. As a result, one embodiment of the subject invention relating to relational data store allows an architecture which never exposes the data store's native SQL interfaces to the Internet. This approach eliminates the risk created by open SQL interface based clients. The only SQL which can be executed is controlled down to the table, field, and operations defined using the object schema manager 203 and is made available from only inside of the corporate network and firewall. This means that organizations can feel secure in knowing that hackers cannot steal passwords and create rogue, destructive, malicious, and/or prying clients which could potentially corrupt, steal, and/or destroy valuable corporate data, unlike other systems currently available which simply rely on passwords and encryption instead of also creating architectural obstructions.

As noted earlier, the preferred embodiment of the subject invention was implemented using the Java programming language, because of its dynamic language support, focus on security, and its overall suitability for the Internet. In the interest of fullest possible disclosure, the following appendices comprise the partial listing of the preferred embodiment.

CocoDemo is a demo applet which uses the CocoBase three-tier adapter API to connect. Appendix A contains "CocoDemo.java" (Copyright © 1996, 1997 Thought, Inc., All rights reserved), the demo applet performing the object application functions and using the API, and "Customer.java" comprising a data object which implements the CBDrop serialization interface, and can therefore be cracked open and constructed by the subject invention.

CocoBeanslmpl and CocoPowder together comprise the implementation of the second adapter and actually handle the server side communication and process the meta data and object attributes, and which executes the SQL. Appendix B contains "CocoDriverInterface.java" (Copyright © 1996, 1997 Thought, Inc., All rights reserved), which implements the API that the first adapter and CocoBeanslmpl/CocoPowder classes both implement.

The present invention may be embodied in other specific forms without departing from the spirit or essential attributes thereof and, accordingly, reference should be made to the appended claims, rather than to the foregoing specification, as indicating the scope of the invention.

8961-7
PBR/114837

-26- 20

APPENDIX A

```
/*
```

Copyright © 1996, 1997 Thought, Inc., All rights reserved

```
This class is a basic extension of the Applet class. It would generally be
used as the main class with a Java browser or the AppletViewer. But an
instance can be added to a subclass of Container. To use this applet with a
browser or the AppletViewer, create an html file with the following code:

<HTML>
    <HEAD>
    <TITLE> A simple program </TITLE>
    </HEAD>
    <BODY>

<APPLET CODE="CocoDemo.class" WIDTH=332 HEIGHT=169></APPLET>

</BODY>

</HTML>

You can add controls to CocoDemo with Cafe Studio.
    (Menus can be added only to subclasses of Frame.)
*/ import java.awt.*;
import java.util.*;
import java.applet.*;
import thought.CocoBase.*;
import Customer;

public class CocoDemo extends Applet {
    CocoDriverInterface myBase;
    public void init() { super.init();

//{{INIT_CONTROLS
        setLayout(null);
        resize(374,262);
        c=new Label("Customer Demo Applet");
```

8961-7
PBR/114837

-27-

```
            add(c);
            c.reshape(56,8,224,22);
            label1=new Label("Name:");
            add(label1);
 5          label1.reshape(19,68,70,15);
            label2=new Label("Address:");
            add(label2);
            label2.reshape(21,98,70,15);
            label3=new Label("Phone:");
10          add(label3);
            label3.reshape(21,135,70,15);
            edit1=new TextField(26);
            add(edit1);
            edit1.reshape(105,60,217,edit1.preferredSize().height);
15          edit2=new TextField(26);
            add(edit2);
            edit2.reshape(105,98,217,edit2.preferredSize().height);
            edit3=new TextField(26);
            add(edit3);
20          edit3.reshape(105,135,217,edit3.preferredSize().height);
            findButton=new Button("Find");
            add(findButton);
            findButton.reshape(14,202,56,30);
            insertButton=new Button("Insert");
25          add(insertButton);
            insertButton.reshape(91,202,49,30);
            deleteButton=new Button("Delete");
            add(deleteButton);
            deleteButton.reshape(224,202,56,30);
30          quitButton=new Button("Quit");
            add(quitButton);
            quitButton.reshape(294,203,49,30);
            updateButton=new Button("Update");
            add(updateButton);
35          updateButton.reshape(161,204,49,29);
            //}}

// Create an initial driver.
            myBase=CocoDriver.getCocoDriver("thought.CocoBase.CocoPowder",
40                  "jdbc.SimpleText.SimpleTextDriver",
                    "jdbc:SimpleText", "myuser", "myuser");

if(myBase.connect() == -1)
                System.out.println("Failed connect!");
45      }
```

8961-7
PBR/114837

```
        public boolean handleEvent(Event event) {
            if(event.id  = =  Event.KEY_PRESS) {
                if(event.target  = =  edit1 && event.key  = =  '\t')
                {
 5                  edit2.requestFocus();
                    return true;
                }
                if(event.target  = =  edit2 && event.key  = =  '\t')
                {
10                  edit3.requestFocus();
                    return true;
                }
                if(event.target  = =  edit3 && event.key  = =  '\t')
                {
15                  edit1.requestFocus();
                    return true;
                }
            }
            if (event.id   = =   Event.ACTION_EVENT  &&  event.target  = =
20      quitButton) {
                    cleanup();
                    return true;
            }
            else
25          if (event.id   = =   Event.ACTION_EVENT  &&  event.target  = =
        findButton) {
                    findCustomer();
                    return true;
            }
30          else
            if (event.id   = =   Event.ACTION_EVENT  &&  event.target  = =
        insertButton) {
                    insertCustomer();
                    return true;
35          }
            else
            if (event.id   = =   Event.ACTION_EVENT  &&  event.target  = =
        updateButton) {
                    updateCustomer();
40                  return true;
            }
            else
            if (event.id   = =   Event.ACTION_EVENT  &&  event.target  = =
        deleteButton) {
45                  deleteCustomer();
```

8961-7
PBR/114837

-29-

```
            return true;
        }
        return super.handleEvent(event);
    }
    public void insertCustomer() {
        customer = new Customer();
        customer.setName(edit1.getText());
        customer.setAddress(edit2.getText());
        customer.setPhone(edit3.getText());
        int insNum = myBase.insert(customer);
        edlg.displayMsg("Inserted "+insNum+" Object(s) into RDBMS");
    }
    public void findCustomer() {
        Customer keyCustomer = new Customer();
        keyCustomer.setName(edit1.getText());
        customer = ((Customer)(myBase.select(keyCustomer)));
        //customer = ((Customer)(myBase.call(keyCustomer)));
        if(customer != null)
        {
            edit1.setText(customer.getName());
            edit2.setText(customer.getAddress());
            edit3.setText(customer.getPhone());
        }
        else
            edlg.displayMsg("Customer '"+keyCustomer.getName()+"' not Found!");
    }
    public void updateCustomer() {
        // New values for customer
        if(customer == null || (customer != null &&
                        !customer.getName().equals(edit1.getText()))) {
                customer = new Customer();
                customer.setName(edit1.getText());
        }
        Customer updateCustomer = (Customer)(customer.clone());
        updateCustomer.setAddress(edit2.getText());
        updateCustomer.setPhone(edit3.getText());
        int insNum = myBase.update(customer,updateCustomer);
        edlg.displayMsg("Updated "+insNum+" Object(s) in RDBMS");
    }
    public void deleteCustomer() {
        customer = new Customer();
        customer.setName(edit1.getText());
        int delRows = myBase.delete(customer);
```

```
            edlg.displayMsg("Deleted "+delRows+" Object(s) from RDBMS");
            edit1.setText("");
            edit2.setText("");
            edit3.setText("");
        }
        public void cleanup() {
            myBase.close();
            System.exit(0);
        }
        //{{DECLARE_CONTROLS
        Label c;
        Label label1;
        Label label2;
        Label label3;
        TextField edit1;
        TextField edit2;
        TextField edit3;
        Button findButton;
        Button insertButton;
        Button deleteButton;
        Button quitButton;
        Button updateButton;
        //}}
        Customer customer;
        ErrorDialog edlg = new ErrorDialog("NONE");

}
```

APPENDIX B

```
/*
 * %W% %E%
 *
 * Copyright (c) 1995-1997 THOUGHT Inc. All Rights Reserved.
 *
 *
 */ package thought.CocoBase;

import java.util.*;
import java.sql.*;
import thought.CocoBase.*;

/**
 * <H3>PROPRIETARY PROPERY of THOUGHT Inc.</H3>
 * <pre>
 * Copyright (c) 1996 THOUGHT Inc. All Rights Reserved.
 *
 * </pre>
 * CocoBase class (DataBase Catalog access class, designed for Catalog driven
 * access to relational databases, Meta Access Software System).<p>
 *
 * A class to access relational databases in a more object oriented fashion.
 *
 *
 * @author    Ward Mullins
 */
public interface CocoDriverInterface {
    /**
     * Post Constructor set methods for CocoBase.
     * Example usage:
     *                 CocoDriver myBase   =   new
     CocoDriver("thought.CocoBase.CocoPowder",
     *                            "jdbc.odbc.JdbcOdbcDriver",
     *                            "jdbc:odbc:Sademo", "sql", "dba");
     * @param myClass the Connection Class
     * @param connectDriver the JDBC Connection driver to be used.
     * @param connectURL the URL to use in connecting to the database instance
     * @param userID the User Id to log into the database with.
     * @param passWord the Password to log into the database with.
     */
```

```
        public void setDebug(boolean debug);
        public void setUseBinding(boolean useBinding);
        public void setUseSchemaPrefixes(boolean useSchemaPrefixes);
        public boolean getDebug();
  5     public boolean getUseBinding();
        public boolean getUseSchemaPrefixes();
        public void setConnectDriver(String connectDriver);
        public void setConnectURL(String connectURL);
        public void setUserId(String userId);
 10     public void setPassWord(String passWord);
        /**
         * Get a handle to the Connection object.  This will ONLY work in a
         * @return The Connection object.
         */
 15     public Object getConnection();

/**
         * Do a commit on the database!
         */
 20     public void commit();

/**
         * Do a rollback on the database!
         */
 25     public void rollback();

/**
         * Set AutoCommit value
         * @param autoCommitValue The flag of whether or not to autoCommit
 30      */
        public void setAutoCommit(boolean autoCommitValue);
        /**
         * Return a ResultSet describing the columns which would be returned from
         * the Catalog manager for catalogName
 35      * @param catalogName the catalogName to find metadata for
         */
        public Vector getColumns(String catalogName);

/**
 40      * Return a ResultSet describing the columns which would be returned from
         * the Catalog manager for anObject
         * @param anObject the Object to find metadata for
         */
        public Vector getColumns(Object anObject);
 45
```

```
        /**
         * Connect to the database using the current connection information.
         */
        public int connect();
   5
        /**
         * Fetch a Collection of all objects matching the criteria in myObject,
         * and using the definition associated with catalogName
         * @param myObject the object to used as a 'template'
  10     * @param catalogName the definition name of object to be retrieved (if
         *  null use object name).
         */
        public Vector selectAll(Object myObject);

15    /**
         * Fetch a Collection of all objects matching the criteria in myObject,
         * and using the definition associated with catalogName
         * @param myObject the object to used as a 'template'
         * @param catalogName the definition name of object to be retrieved (if
  20     *  null use object name).
         */
        public Vector selectAll(Object myObject, String catalogName);

/**
  25     * Fetch a single object matching the criteria in myObject, and using
         * the definition associated with catalogName. If more than one object
         * matches the fetch, only the first is returned!
         * @param myObject the object to used as a 'template'
         * @param catalogName the definition name of object to be retrieved (if
  30     *  null use object name). this allows for multiple maps for the
         *  same Java 'object'.
         */
        public Object select(Object myObject);
        /**
  35     * Fetch a single object matching the criteria in myObject, and using
         * the definition associated with catalogName. If more than one object
         * matches the fetch, only the first is returned!
         * @param myObject the object to used as a 'template'
         * @param catalogName the definition name of object to be retrieved (if
  40     *  null use object name). this allows for multiple maps for the
         *  same Java 'object'.
         */
        public Object select(Object myObject, String catalogName);

45    /**
```

8961-7
PBR/114837

- 34 -

```
     /*
      * Fetch the Number of objects matching the criteria in myObject, and using
      * the definition associated with catalogName.  Return up to the number
      * of objects matched in by numberFinds
      * @param myObject the object to used as a 'template'
 5    * @param catalogName the definition name of object to be retrieved (if
      *   null use object name). this allows for multiple maps for the
      *   same Java 'object'.
      * @param numberFound the maximum number of objects to return.
      */
10      public   Vector   select(Object   myObject,   String   catalogName,   int
     numberFound);

/**
      * Fetch a Collection of all objects matching the criteria in myObject,
15    * and using the definition associated with catalogName
      * @param myObject the object to used as a 'template'
      * @param catalogName the definition name of object to be retrieved (if
      *   null use object name).
      */
20      public Vector callAll(Object myObject);

/**
      * Fetch a Collection of all objects matching the criteria in myObject,
      * and using the definition associated with catalogName
25    * @param myObject the object to used as a 'template'
      * @param catalogName the definition name of object to be retrieved (if
      *   null use object name).
      */
        public Vector callAll(Object myObject, String catalogName);
30

/**
      * Fetch a single object matching the criteria in myObject, and using
      * the definition associated with catalogName.  If more than one object
      * matches the fetch, only the first is returned!
35    * @param myObject the object to used as a 'template'
      * @param catalogName the definition name of object to be retrieved (if
      *   null use object name). this allows for multiple maps for the
      *   same Java 'object'.
      */
40
        public Object call(Object myObject);

/**
45    * Fetch the Number of objects matching the criteria in myObject, and using
```

8961-7
PBR/114837

```
     * the definition associated with catalogName.  Return up to the number
     * of objects matched in by numberFinds
     * @param myObject the object to used as a 'template'
     * @param catalogName the definition name of object to be retrieved (if
     *   null use object name). this allows for multiple maps for the
     *   same Java 'object'.
     * @param procName the Name of the stored procedure to execute.
     * @param numberFound the maximum number of objects to return.
     */
    public Vector call(Object myObject, String catalogName, int numberFound);

/**
     * Insert Object into Database
     * @param anObject the Object to insert into the catalog
     */
    public int insert(Object anObject);

/**
     * Insert Object into Database Using Catalog
     * @param anObject the Object to insert into the catalog
     * @param catalogName catalog name of Object (if null, use object Name),
     * this allows for multiple maps for the same Java 'object'.
     */
    public int insert(Object anObject, String catalogName);

/**
     * Delete Object into Catalog
     * @param anObject the Object to insert into the catalog
     */
    public int delete(Object anObject);

/**
     * Delete Object into Catalog
     * @param anObject the Object to insert into the catalog
     * @param catalogName catalog name of Object (if null, use object Name),
     * this allows for multiple maps for the same Java 'object'.
     */ public int delete(Object anObject, String catalogName);

/**
```

8961-7
PBR/114837

```
     /*
      * Update Object in Catalog.
      * Both anObject and newObject should be of the same object type!
      * @param anObject the Original Object being updated
      * @param newObject the new value of anObject
  5   */ public int update(Object anObject, Object newObject);

/**
 10   * Update Object in Catalog.
      * Both anObject and newObject should be of the same object type!
      * @param anObject the Original Object being updated
      * @param newObject the new value of anObject
      * @param catalogName catalog name of Object (if null, use object Name),
 15   * this allows for multiple maps for the same Java 'object'.
      */ public int update(Object anObject, Object newObject, String catalogName);
     /**
 20   * Close the connection to the Catalog, and to the Database.
      */
     public int close();

}
 25
```

I claim:

1. A system for accessing at least one data store having a data store content and a data store schema as at least one object from at least one object application comprising:

at least one object schema including meta data corresponding to the data store schema;

an adapter abstraction layer having a first interface responsive to the object application including an application bridge receiving an object comprising object attributes and an object name from the object application, said first interface extracting the object attributes and the object name from the object to effect packing of the object attributes and the object name as data, said first interface unpacking the data to effect instantiating the object attributes and the object name into a new object, and a second interface in communication with said first interface and in communication with at least one data store, said second interface having a meta data map comprising at least one object name and providing the data store content from at least one data store corresponding to the object attributes and the meta data.

2. A system according to claim 1 wherein the first interface comprises a first adapter and the second interface comprises a second adapter.

3. A system for accessing at least one data store having a data store content and a data store schema as at least one object from at least one object application comprising:

at least one object schema including meta data corresponding to the data store schema;

a first adapter responsive to the object application including an application bridge receiving an object comprising object attributes and an object name from the object application, said first adapter extracting the object attributes and the object name from the object to effect packing of the object attributes and the object name as data, said first adapter unpacking the data to effect instantiating the object attributes and the object name into a new object; and a second adapter in communication with said first adapter and in communication with at least one data store, said second adapter having a meta data map comprising at least one object name and providing the data store content from at least one data store corresponding to the object attributes and the meta data.

4. A system according to either of claim 2 or 3 further comprising an access code used to access the data store wherein said access code is separate from the object application.

5. A system according to either of claim 1, 2 or 3 wherein said object schema comprises a possible arbitrary joining of the data store content across at least one data store.

6. A system according to either of claim 1, 2 or 3 further comprising an object schema manager in communication with at least one object schema and at least one data store schema, said object schema manager including constructs, facades, objects, and methods, to effect meta data based on at least one object schema and at least one data store schema.

7. A method for accessing at least one data store having a data store content and a data store schema as at least one object from at least one object application comprising the steps of:

creating at least one object schema including meta data corresponding to the data store schema;

communicating a request including an object comprising object attributes and an object name from the object application to an adapter abstraction layer having a first interface and a second interface;

extracting the object attributes and the object name from the object;

packing the object attributes and the object name as data;

communicating the data and the request from the first interface to the second interface;

searching a meta data map comprising at least one object name using the object name to determine whether the object name exists in the meta data map;

if the meta data map contains the object name, using the object attributes and the meta data to generate at least one command for accessing the data store according to the request;

executing at least one such command;

obtaining data store content and/or an execution status based on executing at least one such command;

processing the data store content using meta data;

packing data store content, if found, as data;

communicating the data and the execution status from the second interface to the first interface;

unpacking the data;

instantiating the object attributes and the object name into at least one new object and/or status according to the request and the data; and communicating the request and at least one such new object and/or status from the adapter abstraction layer to the application program.

8. A method for accessing at least one data store having a data store content and a data store schema as at least one object from at least one object application comprising the steps of:

creating at least one object schema including meta data corresponding to the data store schema;

communicating a request including an object comprising object attributes and an object name from the object application to a first adapter;

extracting the object attributes and the object name from the object;

packing the object attributes and the object name as data;

communicating the data and the request from the first adapter to a second adapter;

searching a meta data map comprising at least one object name using the object name to determine whether the object name exists in the meta data map;

if the meta data map contains the object name, using the object attributes and the meta data to generate at least one command for accessing the data store according to the request;

executing at least one such command;

obtaining data store content and an execution status based on executing at least one such command;

processing the data store content using meta data;

packing data store content, if found, as data;

communicating the data and the execution status from the second adapter to the first adapter;

unpacking the data;

instantiating the object attributes and the object name into at least one new object and/or status according to the request and the data; and communicating the request and at least one such new object from the first adapter to the application program.

* * * * *